United States Patent
Zhang et al.

(10) Patent No.: US 9,220,136 B2
(45) Date of Patent: Dec. 22, 2015

(54) METHOD AND APPARATUS FOR CONTROLLING A LIGHTING DEVICE

(71) Applicant: Marvell World Trade Ltd., St. Michael (BB)

(72) Inventors: Wanfeng Zhang, Palo Alto, CA (US); Pantas Sutardja, Los Gatos, CA (US); Yonghua Song, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 269 days.

(21) Appl. No.: 13/899,121

(22) Filed: May 21, 2013

(65) Prior Publication Data

US 2013/0307434 A1 Nov. 21, 2013

Related U.S. Application Data

(60) Provisional application No. 61/779,934, filed on Mar. 13, 2013, provisional application No. 61/649,736, filed on May 21, 2012, provisional application No. 61/740,308, filed on Dec. 20, 2012.

(51) Int. Cl.
- *H05B 41/16* (2006.01)
- *H05B 37/02* (2006.01)
- *H05B 33/08* (2006.01)
- *H05B 41/392* (2006.01)

(52) U.S. Cl.
CPC ........ *H05B 33/0815* (2013.01); *H05B 41/3924* (2013.01); *Y02B 20/346* (2013.01)

(58) Field of Classification Search
CPC .......... H05B 33/0815; H05B 41/3924; Y02B 20/346
USPC .......................... 315/141, 212, 219, 254, 276
See application file for complete search history.

(56) References Cited

U.S. PATENT DOCUMENTS

| | | | |
|---|---|---|---|
| 4,866,350 A * | 9/1989 | Counts | 315/209 R |
| 6,657,401 B2 * | 12/2003 | Kominami et al. | 315/291 |
| 7,253,565 B2 * | 8/2007 | Kang et al. | 315/276 |
| 7,973,493 B2 * | 7/2011 | Onishi et al. | 315/291 |
| 8,541,952 B2 * | 9/2013 | Darshan | 315/209 R |
| 8,729,811 B2 * | 5/2014 | Melanson | 315/219 |
| 2011/0193488 A1 | 8/2011 | Kanamori et al. | |

FOREIGN PATENT DOCUMENTS

| | | |
|---|---|---|
| EP | 1 128 711 A2 | 8/2001 |
| EP | 2 164 300 A1 | 3/2010 |
| WO | WO 2010/086835 A1 | 8/2010 |

OTHER PUBLICATIONS

International Search Report and Written Opinion issued Sep. 19, 2013, in PCT/US2013/042032 filed May 21, 2013.

* cited by examiner

*Primary Examiner* — Kenneth B Wells

(57) ABSTRACT

Aspects of the disclosure provide a method. The method includes detecting a dimming characteristic in an energy source that provides energy to be transferred to a load via a magnetic component, receiving a dimming control signal, and controlling a switch in connection with the magnetic component based on the dimming characteristic and the dimming control signal to transfer energy to the load via the magnetic component.

14 Claims, 4 Drawing Sheets

METHOD AND APPARATUS FOR CONTROLLING A LIGHTING DEVICE

INCORPORATION BY REFERENCE

This present disclosure claims the benefit of U.S. Provisional Application No. 61/649,736, "Wireless Control LED Lighting Dimming with Traic Dimmer Compatibility" filed on May 21, 2012, U.S. Provisional Application No. 61/779,934, "Wireless Control LED Lighting Dimming with Traic Dimmer Compatibility" filed on Mar. 13, 2013, and U.S. Provisional Application No. 61/740,308, "Dimmable LED Lighting Control Method Compatible with Phase Cut Dimmer and Serial Port Interface (Example: 12c) Control Devices" filed on Dec. 20, 2012, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Light emitting diode (LED) lighting devices provide the advantages of low power consumption and long service life. Thus, LED lighting devices may be used as general lighting equipment in the near future to replace, for example, fluorescent lamps, bulbs, halogen lamps, and the like.

SUMMARY

Aspects of the disclosure provide a method. The method includes detecting a dimming characteristic in an energy source that provides energy to be transferred to a load via a magnetic component, such as a transformer, an inductor and the like, receiving a dimming control signal, and controlling a switch in connection with the magnetic component based on the dimming characteristic and the dimming control signal to transfer energy to the load via the magnetic component.

To detect the dimming characteristic, the method includes detecting at least one of a conduction angle, a phase-cut angle, and a dimming percentage of the energy source.

To receive the dimming control signal, in an example, the method includes receiving the dimming control input from a control device via a wired connection. In another example, the method includes receiving the dimming control input from a control device via a wireless connection.

To control the switch based on the dimming characteristic and the dimming control signal, the method includes prioritizing the dimming characteristic over the dimming control signal and controlling the switch in connection with the magnetic component based on the prioritized dimming characteristic and the dimming control signal. In an embodiment, the method includes entering a control mode to control the switch with a substantially constant turn-on time when the phase-cut angle is about zero, and determining control parameters for the control mode based on the dimming control signal. In another embodiment, the method includes entering a control mode to control the switch based on a current flowing through the switch when the phase-cut angle is not zero, and determining control parameters for the control mode based on the dimming control signal.

To determine the control parameters for the control mode based on the dimming control signal, the method includes detecting whether the dimming control signal is compatible with the dimming characteristic, ignoring the dimming control signal when the dimming control signal is not compatible with the dimming characteristic, and adjusting values of the control parameters based on the dimming control signal when the dimming control signal is compatible with the dimming characteristic.

Aspects of the disclosure provide a circuit. The circuit includes a detecting circuit, an interface circuit and a controller. The detecting circuit is configured to detect a dimming characteristic in an energy source that provides energy to be transferred to a load via a magnetic component, such as a transformer, an inductor, and the like. The interface circuit is configured to receive a dimming control signal. The controller is configured to control a switch in connection with the magnetic component based on the dimming characteristic and the dimming control signal to transfer energy to the load via the magnetic component.

Aspects of the disclosure provide an apparatus. The apparatus includes an energy transfer module, a detecting circuit, an interface circuit, and a controller. The energy transfer module is configured to transfer electric energy from an energy source to an output device. The detecting circuit is configured to detect a dimming characteristic in the energy source. The interface circuit is configured to receive a dimming control signal. The controller is configured to control the energy transfer module based on the dimming characteristic and the dimming control signal to transfer energy to the output device.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
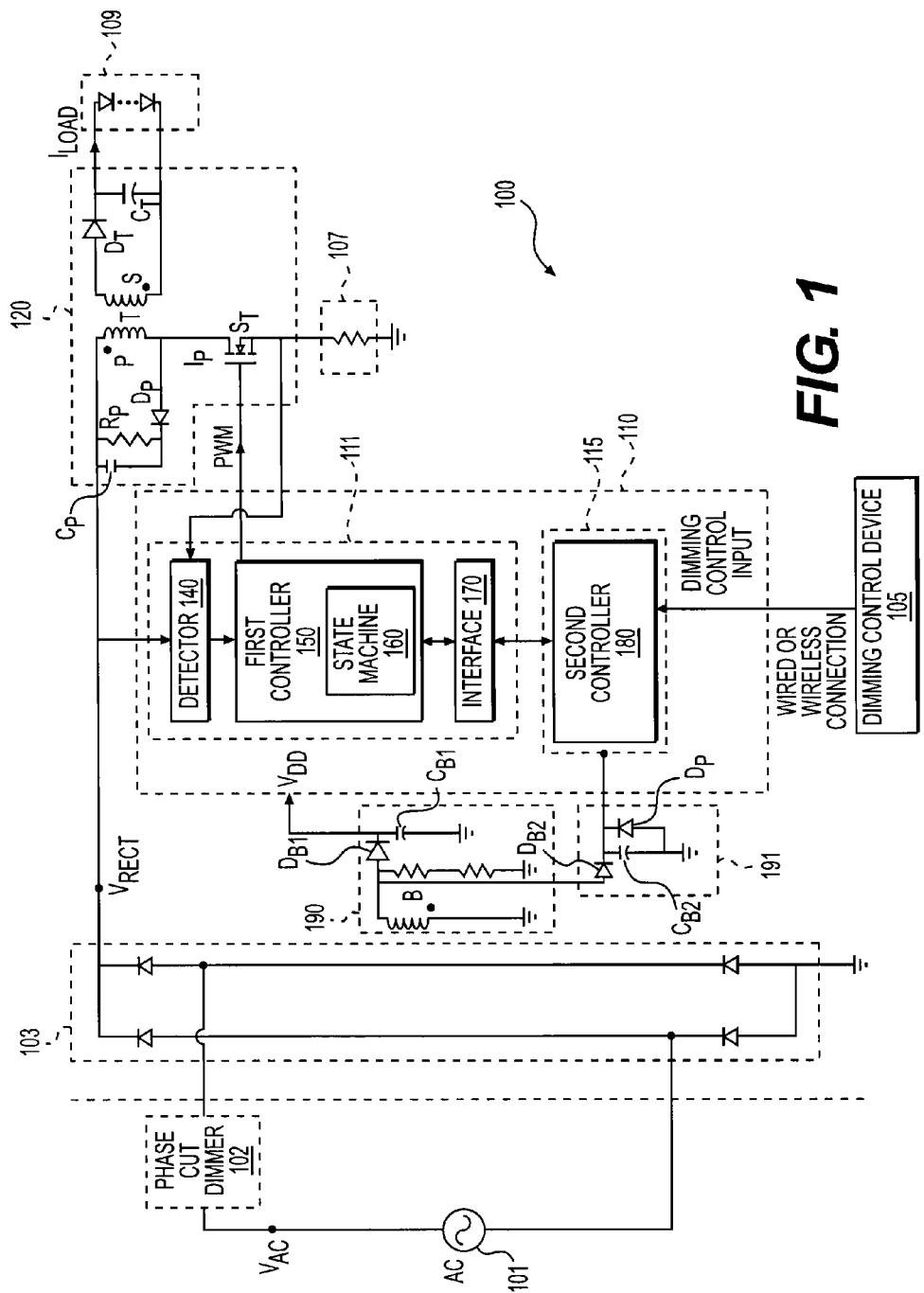
FIG. 1 shows a block diagram of an electronic system 100 according to an embodiment of the disclosure.

FIG. 1 shows a block diagram of an electronic system 100 according to an embodiment of the disclosure. The electronic system 100 operates based on an alternating current (AC) voltage $V_{AC}$ provided by an AC power supply 101 with or without a dimmer 102. Further, the electronic system 100 includes a dimming control component 105 that generates a dimming control input. The electronic system 100 operates based on a dimming characteristic of the power supply, and the dimming control input.

According to an aspect of the disclosure, the electronic system 100 is operable under various dimming characteristic of the power supply. In an example, a power supply may have a pre-installed phase-cut dimmer 102, such as a triode for alternating current (TRIAC) type dimmer having an adjustable dimming angle α. The dimming angle α defines a size of a phase-cut range during which the TRIAC is turned off, and a conduction angle is a phase range that is out of the phase-cut range during which the TRIAC is turned on. During an AC cycle, when the phase of the AC voltage $V_{AC}$ is in the phase-cut range, the TRIAC is turned off. Thus, an output voltage of the dimmer 102 is about zero. When the phase of the AC voltage $V_{AC}$ is out of the phase-cut range (in the conduction angle), the TRIAC is turned on. Thus, the output voltage of the dimmer 102 is about the same as the AC voltage $V_{AC}$. The phase-cut dimmer 102 can be a leading edge TRIAC, a trailing edge TRIAC, or other types of dimmer.

In another example, the power supply does not have any pre-installed dimmer. In addition, the AC power supply 101 can be any suitable AC power supply, such as 60 Hz 110V AC power supply, 50 Hz 220V AC power supply, and the like.

Further, the electronic system 100 receives one or more additional dimming control inputs. In an example, the electronic system 100 includes a digital addressable lighting interface (DALI) (not shown) that is configured to receive a dimming control input via a wired connection from the dimming control device 105. In another example, the electronic system 100 includes an interface configured for wirelessly receiving to receive a dimming control input via a wireless connection from the dimming control device 105. The interface can be configured according to any suitable wireless technology, such as a radio frequency (RF) technology, a WiFi technology, a Zigbee technology, an infrared technology, a blue-tooth technology, and the like.

According to an aspect of the disclosure, the electronic system 100 is configured to prioritize the dimming characteristic of the power supply to determine an operation mode and values of control parameters for the operation mode, and then further adjust the values of the control parameters based on the dimming control input.

In an embodiment, the electronic system 100 is configured to detect a dimming angle of the power supply in order to determine the dimming characteristic. For example, when the dimming angle is about zero, either the dimmer 102 does not exist, or the dimmer 102 is adjusted with the dimming angle being zero, and the power supply has a zero-dimming characteristic; when the dimming angle is non-zero, the dimmer 102 exists and the power supply has a non-zero dimming characteristic. Further, in an embodiment, the dimming characteristics include a low dimming angle characteristic and a high dimming angle characteristic. For example, when the dimming angle is smaller than a threshold, such as 45° (or the conduction angle is larger than a threshold), the power supply has a low dimming angle characteristic; otherwise, the power supply has a high dimming angle characteristic.

According to an aspect of the disclosure, the electronic system 100 is configured to prioritize the dimming characteristic over the dimming control input for operation and dimming control. In an embodiment, the electronic system 100 enters an operation mode according to the dimming characteristic, and then in the operation mode to operate according to the dimming control input. For example, when the power supply has the zero dimming characteristic, the electronic system 100 enters a first operation mode to perform power factor correction (PFC) and total harmonic distortion (THD) reduction to improve energy efficiency and then support a full range of dimming control in response to the dimming control input; when the power supply has the low dimming angle characteristic, the electronic system 100 is configured to enter a second operation mode to support the operations of the dimmer 102, and then support a full range of dimming control in response to the dimming control input; and when the power supply has the high dimming angle characteristic, the electronic system 100 is configured to enter a third operation mode to support the operations of the dimmer 102 and then support a partial range of dimming control in response to the dimming control input.

Specifically, in the FIG. 1 example, the electronic system 100 includes a rectifier 103, a circuit 110, an energy transfer module 120, a current sensor 107, and an output device 109. These elements are coupled together as shown in FIG. 1.

The rectifier 103 rectifies an AC voltage to a fixed polarity, such as to be positive. In the FIG. 1 example, the rectifier 103 is a bridge rectifier. The bridge rectifier 103 receives the AC voltage, or the output voltage of the dimmer 102, and rectifies the received voltage to a fixed polarity, such as to be positive. The rectified voltage $V_{RECT}$ is provided to the following circuits, such as the circuit 110, the energy transfer module 120, and the like, in the electronic system 100.

The energy transfer module 120 transfers electric energy provided by the rectified voltage $V_{RECT}$ to the output device 109 under the control of the circuit 110. The energy transfer module 120 can have any suitable topology, such as a fly-back topology, a buck-boost topology, and the like. In an embodiment, the energy transfer module 120 is configured to use a magnetic component, such as a transformer, an inductor, and the like to transfer the electric energy. In the FIG. 1 example, the energy transfer module 120 uses a fly-back topology and includes a transformer T and a switch $S_T$. The energy transfer module 120 also includes other suitable components, such as a diode $D_T$, a capacitor $C_T$, and the like. The transformer T includes a primary winding (P) coupled with the switch $S_T$ to receive the rectified voltage $V_{RECT}$ and a secondary winding (S) coupled to the output device 109 to drive the output device 109. It is noted that the energy transfer module 120 can be suitably modified to use an inductor to transfer the electric energy.

In an embodiment, the circuit 110 provides control signals to control the operations of the switch $S_T$ to transfer the electric energy from the primary winding to the secondary winding. In an example, the circuit 110 provides a pulse width modulation (PWM) signal with pulses having a relatively high frequency, such as in the order of 100 KHz, and the like, to control the switch $S_T$.

Specifically, in an example, when the switch $S_T$ is switched on, a current $I_P$ flows through the primary winding of the transformer T, and the switch $S_T$. The polarity of the transformer T and the direction of the diode $D_T$ can be arranged such that there is no current in the secondary winding of the transformer T when the switch $S_T$ is switched on. Thus, the received electric energy is stored in the transformer T.

When the switch $S_T$ is switched off, the current $I_P$ becomes zero. The polarity of the transformer T and the direction of the diode $D_T$ can enable the secondary winding to deliver the stored electric energy to the capacitor $C_T$ and the output device 109. The capacitor $C_T$ can filter out the high frequency components and enable a relatively stable load current $I_{LOAD}$ to be driven to the output device 109.

The output device 109 can be any suitable device, such as a lighting device, a fan and the like. In an embodiment, the output device 109 includes a plurality of light emitting diodes (LEDs). The output device 109 and the other components of the electronic system 100 are assembled into a package to form an LED lighting device to replace, for example, a fluorescent lamp, a halogen lamp, and the like.

The current sensor 107 is configured to sense the current $I_P$ flowing through the primary winding, and provide the sensed current to the circuit 110. In an example, the current sensor 107 includes a resistor having a relatively small resistance such that a voltage drop on the resistor is small compared to the rectified voltage $V_{RECT}$. The voltage drop is indicative of the current $I_P$. In an example, the voltage drop is provided to the circuit 110 as the sensed current.

According to an embodiment of the disclosure, the circuit 110 monitors the input voltage, such as the rectified voltage $V_{RECT}$, and detects the dimming characteristic of the power supply. Further, the circuit 110 receives the dimming control input. Then the circuit 110 generates the PWM signals based on the dimming characteristic and the dimming control input to control the switch $S_T$.

In the FIG. 1 example, the circuit 110 includes a detector module 140, a first controller 150, and a second controller 180. The detector module 140 includes various signal processing circuits, such as an analog signal processing circuit, a digital signal processing circuit and the like to detect various parameters, such as the dimming characteristic, the dimming angle, the current $I_P$ flowing through the switch $S_T$, and the like. In an example, the detector module 140 detects a time duration in a half AC cycle when the TRIAC in the dimmer 102 has been turned off, and calculates a percentage of time duration to the half AC cycle. The percentage can be used to indicate the dimming characteristic of the power supply. For example, when the percentage is 0%, the power supply has a zero-dimming characteristic. When the percentage is smaller than a threshold, such as 25%, the power supply has a low-dimming characteristic. When the percentage is larger than the threshold, the power supply has high dimming characteristic.

The second controller 180 is configured to receive the dimming control input. In an example, the second controller 180 is configured to control communication over a wired connection to receive the dimming control input. In another example, the second controller 180 is configured to control communication over a wireless connection to receive the dimming control input. The second controller 180 provides the dimming control input to the first controller 150. The first controller 150 receives the dimming characteristic and the dimming control input, and is configured to adjust control signals, such as the PWM signal, and the like, based on the dimming characteristic and the dimming control input to control the operations of the energy transfer module 120.

Specifically, in an example, the first controller 150 has multiple control modes for different dimming characteristics that generate the PWM signal according to different algorithms or different values of control parameters. In an embodiment, the first controller 150 includes a state machine 160 configured to determine a suitable control mode based on dimming characteristic and the dimming control input. In an example, the first controller 150 has a first mode for the zero-dimming characteristic that generates the PWM signal according to a first algorithm. Further, the first controller 150 has a second mode for the low-dimming characteristic that generates the PWM signal according to a second algorithm and a third mode for the high-dimming characteristic that generates the PWM signal according to the second algorithm with different values of control parameters. In an embodiment, the values of the control parameters are adjusted based on the dimming control input.

In the embodiment, according to the first algorithm, the first controller 150 provides the PWM signal to control the switch $S_T$ to have a relatively constant turn-on time over the switching cycles in an AC cycle. For example, in an AC cycle, the PWM signal includes pulses to repetitively switch on and off the switch $S_T$. The first controller 150 can maintain the pulses in the PWM signal to have the same pulse width during the AC cycle, such that the turn-on time of the switch $S_T$ over the switching cycles in the AC cycle is about the same. It is noted that, according to an aspect of the disclosure, the turn-on time in different AC cycles can be different. In an example, the turn-on time and switching frequency are fixed during an AC cycle, but can be adaptively changed over time.

Further, the first controller 150 adjusts the turn-on time and the switching frequency according to the dimming control input. In an example, when the dimming control input is adjusted to reduce a preferred light output, the first controller 150 provides the PWM signals with a reduced turn-on time. In another example, the first controller 150 provides the PWM signals with a reduced switching frequency to reduce the light output.

The first controller 150 may also generate the PWM signal based on other parameters. For example, according to the first algorithm, the first controller 150 can control the PWM signal based on, for example, a maximum on time (i.e., 10 µs), a minimum frequency (i.e., 70 KHz), a maximum frequency (i.e., 200 KHz), and the like. Further, in an example, the first controller 150 limits a maximum peak current in the primary winding.

Further, according to the second algorithm, the first controller 150 provides the PWM signal to the switch $S_T$ to maintain a relatively constant peak current in the primary winding when the TRIAC in the dimmer 102 is turned on. In an example, the detector module 140 detects the time when the TRIAC in the dimmer 102 is turned on and informs the first controller 150. When the TRIAC in the dimmer 102 is turned on, the first controller 150 provides the PWM signal to the switch $S_T$ to repetitively turn on and off the switch $S_T$ to maintain the relatively constant peak current. For example, at a time, the first controller 150 changes the PWM signal from "0" to "1" to turn on the switch $S_T$. When the switch $S_T$ is turned on, the current $I_P$ starts to increase. The detector module 140 detects the current $I_P$, for example, in a form of a voltage drop on a resistor, and provides detected voltage drop to the first controller 150. The first controller 150 receives the detected voltage drop, and changes the PWM signal from "1" to "0" to turn off the switch $S_T$ when the detected voltage drop is substantially equal to a threshold, such as 0.4V, and the like.

Further, for different dimming control inputs, the first controller 150 adjusts the constant peak current and the switching frequency used in the second algorithm accordingly. In an example, the constant peak current is reduced when the dimming control input is adjusted to reduce light output. In another example, the first controller 150 provides the PWM signals with a reduced switching frequency to reduce the light output when the diming control input is adjusted to reduce light output.

According to an embodiment of the disclosure, the first controller 150 prioritizes the dimming characteristic and determines whether the dimming control input is compatible with the dimming characteristic. When the dimming control input is compatible with the dimming characteristic, the first controller 150 determines the suitable algorithm for generating the PWM signal based on the dimming characteristic and adjusts the control parameters based on the dimming control input. When the dimming control input is not compatible with the dimming characteristic, in an example, the first controller 150 ignores the dimming control input and determines the suitable algorithm and the control parameters based on the dimming characteristic of the power supply.

In an example, the power supply has a high-dimming characteristic (e.g., 90° dimming angle, 50% dimming percentage). When the dimming control input is indicative of 100% (full) to 50% (half) light output, the dimming control input is not compatible with the dimming characteristic, the first controller 150 ignores the dimming control input, and then determines the suitable algorithm and the control parameters based on the dimming characteristic of the power supply. When the dimming control input is indicative less than 50% light output, the dimming control input is compatible with the dimming characteristic, the first controller 150 then determines the suitable algorithm based on the dimming characteristic and adjusts the control parameters based on the dimming control input.

It is noted that the electronic system 100 can be implemented using one or more integrated circuit (IC) chips. In an example, the circuit 110 is implemented as a single IC chip. Further, the switch $S_T$ can be implemented as a discrete device or can be integrated with the circuit 110 on the same IC chip. The IC chip can be powered by a battery or the power supply. In the FIG. 1 example, the electronic system 100 includes a bias circuit 190 to provide a supply voltage $V_{DD}$ to the IC chip. The bias circuit 190 includes a bias winding B that is part of the transformer T. The bias winding B is coupled with the primary winding P to transfer a portion of the electric energy from the power supply to power the IC chip. The bias circuit 190 can include any suitable circuit components, such as a diode $D_{B1}$, a capacitor $C_{B1}$, resistors, and the like.

In another example, the circuit 100 is implemented on two IC chips 111 and 115. The IC chip 111 can be powered up by the bias circuit 190 and the IC chip 115 can be powered up by a bias circuit 191. In this example, the two IC chips 111 and 115 include suitable interface circuit to enable communications between the two IC chips. In the FIG. 1 example, the IC chip 111 includes the detector module 140, the first controller 150 and an interface 170. The IC chip 115 includes the second controller 180, and other suitable circuits (not shown). In an embodiment, the interface 170 is a serial port interface, such as an $I^2C$ type interface, and the like to enable communications between the first controller 150 and the second controller 180.

Figure 2:
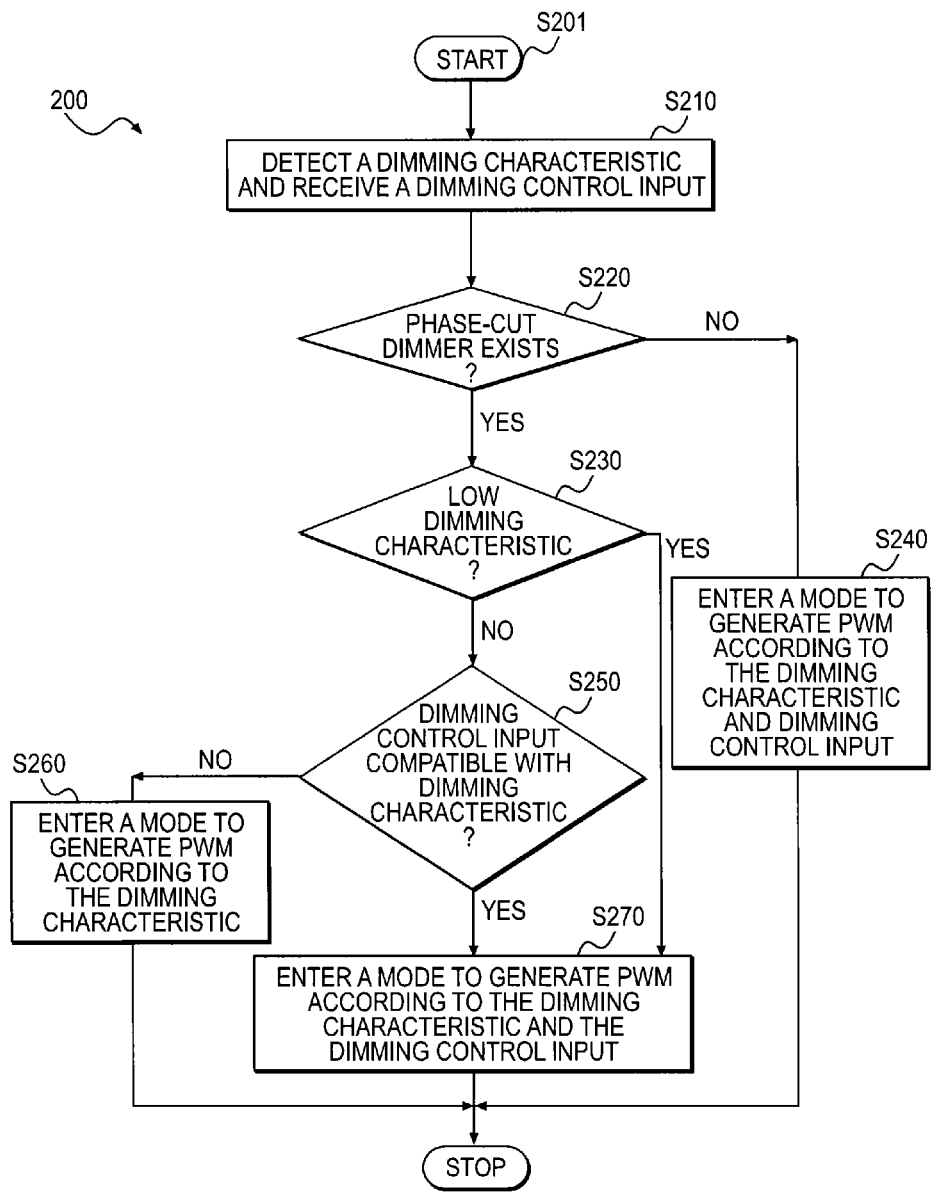
FIG. 2 shows a flow chart outlining a process example according to an embodiment of the disclosure.

FIG. 2 shows a flow chart outlining a process example 200 according to an embodiment of the disclosure. The process 200 can be executed by the circuit 110 to determine a mode for generating the PWM signal. The process starts at S201 and proceeds to S210.

At S210, a dimming characteristic of the power supply is detected and a dimming control input is received. In an example, the detector module 140 detects the dimming characteristic, such as existence of a phase-cut dimmer, a dimming angle, a conduction angle, a dimming percentage, and the like. Further, the interface 170 receives the dimming control input from the second controller 180. The dimming control input can be sent from the dimming control device 105 to the second controller 180 via a wired or a wireless connection.

At S220, the first controller 150 determines whether a phase-cut dimmer exists based on the dimming characteristic. When the phase-cut dimmer exists, the process proceeds to S230; otherwise the process proceeds to S240.

At S230, the first controller 150 determines whether the power supply has a low-dimming characteristic or a high dimming characteristic. When the power supply has the low-dimming characteristic, the process proceeds to S270; and when the power supply has the high-dimming characteristic, the process proceeds to S250. In an example, the conduction angle or the dimming angle is compared to a suitable threshold to make the decision. In another example, the dimming percentage is compared with a suitable threshold to make the decision.

At S240, the first controller 150 enters a mode based on the dimming characteristic and adjusts control parameters based on the dimming control input. In an example, the first controller 150 enters a mode to use the first algorithm to generate the PWM signal, and adjusts the control parameters based on the dimming control input. Then the process proceeds to S299 and terminates.

At S250, the first controller 150 determines whether the dimming control input is compatible with the dimming characteristic. When the dimming control input is compatible with the dimming characteristic, the process proceeds to S270; otherwise, the process proceeds to S260.

At S260, the first controller 150 ignores the dimming control input, and enters a mode to generate the PWM signal based on the dimming characteristic. Then the process proceeds to S299 and terminates.

At S270, the first controller 150 enters a mode to use the second algorithm to generate the PWM signal, and adjusts the control parameters based on the dimming control input. Then the process proceeds to S299 and terminates.

Figure 3:
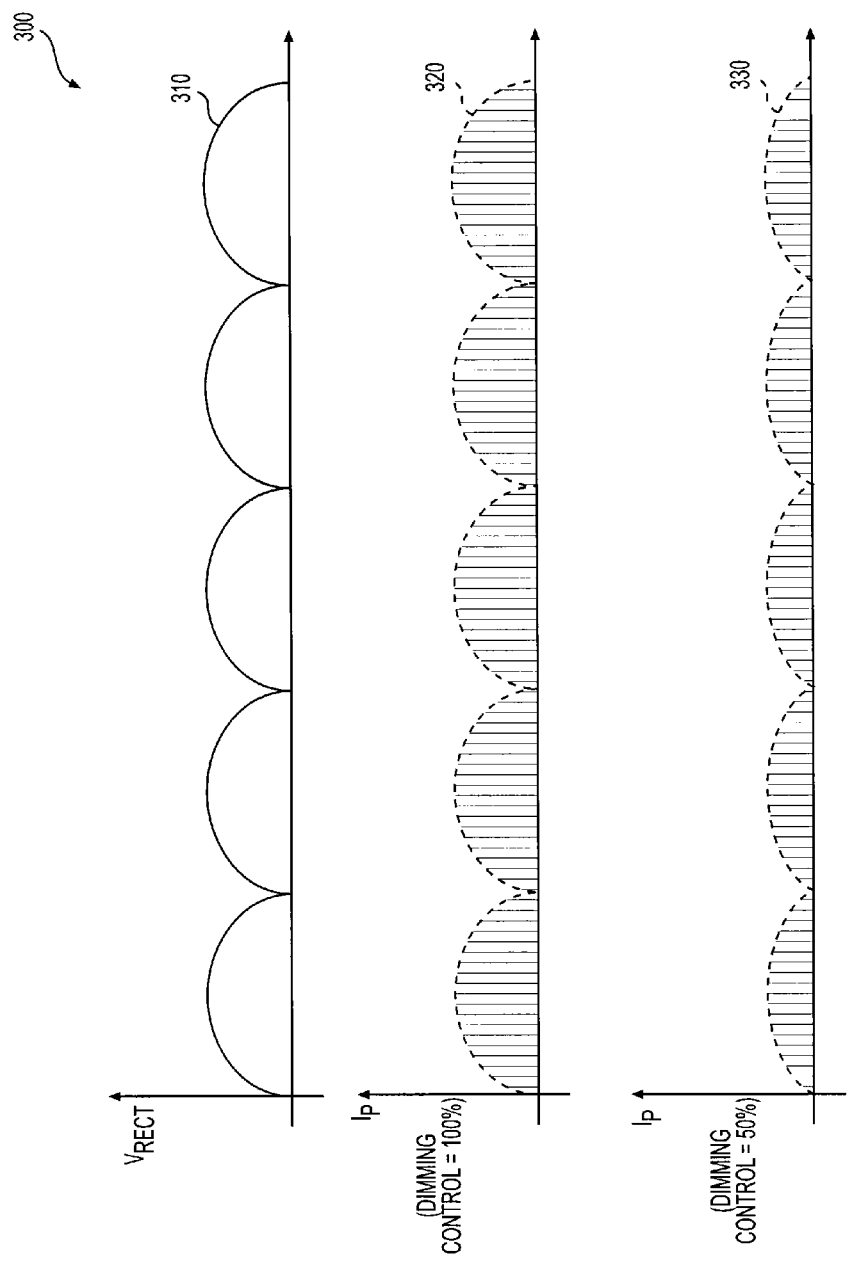
FIG. 3 shows a plot of voltage and current waveforms according to an embodiment of the disclosure.

FIG. 3 shows a plot 300 of voltage and current waveforms with time according to an embodiment of the disclosure. The plot 300 includes a first waveform 310 for the rectified voltage $V_{RECT}$, a second waveform 320 for the current $I_P$ when the dimming control is indicative of 100% light output, and a third waveform 330 for the current $I_P$ when the dimming control is indicative of 50% light output. In this example, the power supply has zero-dimming characteristic, as shown by the first waveform 310, thus the PWM signal is generated in a manner to maintain a constant turn-on time during each AC cycle. The peak current has about the same phase as the rectified voltage $V_{RECT}$. When the dimming control is adjusted to reduce the light output, in an example, the turn-on time is adjusted to reduce accordingly to reduce the light output.

Figure 4:
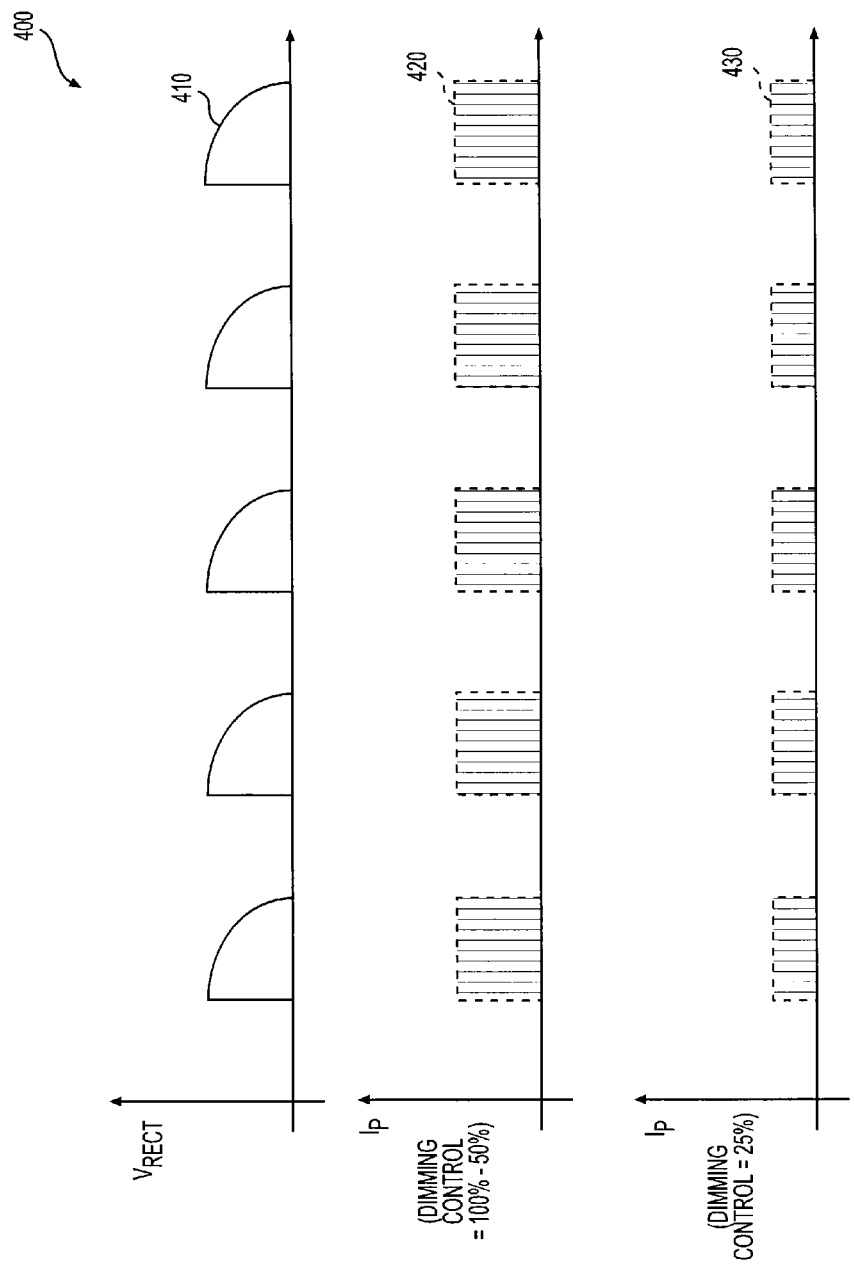
FIG. 4 shows a plot of voltage and current waveforms according to an embodiment of the disclosure.

FIG. 4 shows a plot 400 of voltage and current waveforms with time according to an embodiment of the disclosure. The plot 400 includes a first waveform 410 for the rectified voltage $V_{RECT}$, a second waveform 420 for the current $I_P$ when the dimming control is not compatible with the dimming characteristic of the power supply, and a third waveform 430 for the current $I_P$ when the dimming control is compatible with the dimming characteristic of the power supply. In this example, the power supply has the high-dimming characteristic (90° dimming angle or 50% dimming percentage), as shown by the first waveform 410, thus the PWM signal is generated in a manner to maintain a constant peak current when the TRIAC is turned on. When the dimming control is not compatible with the dimming characteristic, the dimming control is ignored as shown by the second waveform 420. When the dimming control is compatible with the dimming characteristic, the control parameters, such as the constant peak current, the switching frequency, and the like are adjusted according to the dimming control, as shown by the third waveform 430.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:
1. A method, comprising:
   detecting a dimming characteristic in an energy source that provides energy to be transferred to a load via a magnetic component;
   receiving a dimming control signal;
   entering a control mode to control a switch in connection with the magnetic component; and determining control parameters for the control mode to transfer energy to the load via the magnetic component, wherein determining the control parameters further comprises:
  detecting whether the dimming control signal is compatible with the dimming characteristic;
  ignoring the dimming control signal when the dimming control signal is not compatible with the dimming characteristic; and
  adjusting values of the control parameters based on the dimming control signal when the dimming control signal is compatible with the dimming characteristic.

2. The method of claim 1, wherein detecting the dimming characteristic in the energy source that provides the energy to be transferred to the load via the magnetic component further comprises:
  detecting at least one of a conduction angle, a phase-cut angle and a dimming percentage of the energy source.

3. The method of claim 1, wherein receiving the dimming control signal further comprises at least one of:
  receiving the dimming control signal from a wired control component; and
  receiving the dimming control signal from a wireless control component.

4. The method of claim 1, further comprising:
  prioritizing the dimming characteristic over the dimming control signal; and
  controlling the switch in connection with the magnetic component based on the prioritized dimming characteristic and the dimming control signal.

5. The method of claim 2, wherein the control mode is a first control mode, further comprising:
  entering a second control mode to control the switch with a substantially constant turn-on time when the phase-cut angle is about zero; and
  determining control parameters for the second control mode based on the dimming control signal.

6. A circuit, comprising:
  a detecting circuit configured to detect a dimming characteristic in an energy source that provides energy to be transferred to a load via a magnetic component;
  an interface circuit configured to receive a dimming control signal; and
  a controller configured to enter a control mode to control a switch in connection with the magnetic component, and to determine control parameters for the control mode to transfer energy to the load via the magnetic component, the controller being further configured to detect whether the dimming control signal is compatible with the dimming characteristic, ignore the dimming control signal when the dimming control signal is not compatible with the dimming characteristic, and adjust values of the control parameters based on the dimming control signal when the dimming control signal is compatible with the dimming characteristic.

7. The circuit of claim 6, wherein the detecting circuit is configured to detect at least one of a conduction angle, a phase-cut angle and a dimming percentage of the energy source.

8. The circuit of claim 6, wherein the controller is a first controller, and the circuit further comprises:
  a second controller configured to receive the dimming control input from a wired control component or receive the dimming control signal from a wireless control component, and provide the dimming control signal to the interface circuit.

9. The circuit of claim 8, wherein the first controller and the second controller are on the same integrated circuit (IC) chip.

10. The circuit of claim 8, wherein the first controller and the second controller are on separate integrated circuit (IC) chips.

11. The circuit of claim 6, wherein the controller is configured to prioritize the dimming characteristic over the dimming control signal, and control the switch in connection with the magnetic component based on the prioritized dimming characteristic and the dimming control signal.

12. The circuit of claim 7, wherein the control mode is a first control mode and the controller is further configured to enter a second control mode to control the switch with a substantially constant turn-on time when the phase-cut angle is about zero, and determine control parameters for the second control mode based on the dimming control signal.

13. An apparatus, comprising:
  an energy transfer module configured to transfer electric energy from an energy source to an output device;
  a detecting circuit configured to detect a dimming characteristic in the energy source;
  an interface circuit configured to receive a dimming control signal; and
  a controller configured to enter a first control mode to control a switch in connection with the energy transfer module with a substantially constant turn-on time when a phase-cut angle of the dimming characteristic is about zero, and determine control parameters for the control mode to transfer energy to the output device, the controller being further configured to enter a second control mode to control the switch based on a current flowing through the switch when the phase-cut angle is not zero, detect whether the dimming control signal is compatible with the dimming characteristic, ignore the dimming control signal when the dimming control signal is not compatible with the dimming characteristic, and adjust values of control parameters for the second control mode based on the dimming control signal when the dimming control signal is compatible with the dimming characteristic.

14. The apparatus of claim 13, wherein the controller is configured to prioritize the dimming characteristic over the dimming control signal, and control the switch in connection with a magnetic component based on the prioritized dimming characteristic and the dimming control signal.

* * * * *